United States Patent [19]
Wooten et al.

[11] 3,749,929
[45] July 31, 1973

[54] CHEMILUMINESCENT METHOD AND APPARATUS

[75] Inventors: George W. Wooten, Centerville; Rumult Iltis, Amberly, both of Ohio; Victor L. Johnson, Slaton, Tex.

[73] Assignee: Monsanto Research Corporation, St. Louis, Mo.

[22] Filed: Oct. 7, 1971

[21] Appl. No.: 187,265

[52] U.S. Cl............... 250/369, 23/232 E, 23/254 E
[51] Int. Cl............................................. H01j 39/00
[58] Field of Search................. 250/83 CD, 217; 23/232 R, 232 E, 254 R, 254 E, 230 PC; 73/73

[56] References Cited
UNITED STATES PATENTS

| | | | |
|---|---|---|---|
| 3,647,387 | 3/1972 | Benson | 23/232 R |
| 3,540,851 | 11/1970 | Vree | 23/232 E |
| 3,528,779 | 9/1970 | Fontijn | 23/254 E |

*Primary Examiner*—James W. Lawrence
*Assistant Examiner*—D. C. Nelms
*Attorney*—L. Bruce Stevens, Jr.

[57] ABSTRACT

The invention is a chemiluminescent method and apparatus for detecting $NO_x$ (NO and $NO_2$), $SO_2$, CO and other gases which react with atomic oxygen to produce chemiluminescence. Atomic oxygen generated by pulse electrical discharge is added at a controlled and known flow rate to a reaction chamber to which is also added at a controlled and known flow rate a gas mixture to be analyzed. The reaction chamber is maintained at a sufficient pressure to support chemiluminescence, normally above about 0.1 Torr and in the range of about 0.5 to 5.0 Torr. Photoelectric means is used to measure the chemiluminescence, and the photoelectric means is synchronized with the pulse discharge so that photoelectric means is turned off during the time of a pulse and for sufficient time thereafter to allow the light generated by the pulse discharge to disappear, whereby the only light the photoelectric means sees is chemiluminescence. The reaction zone and the oxygen generating means are compact and are located adjacent one another to allow miniaturization of the equipment.

4 Claims, 1 Drawing Figure

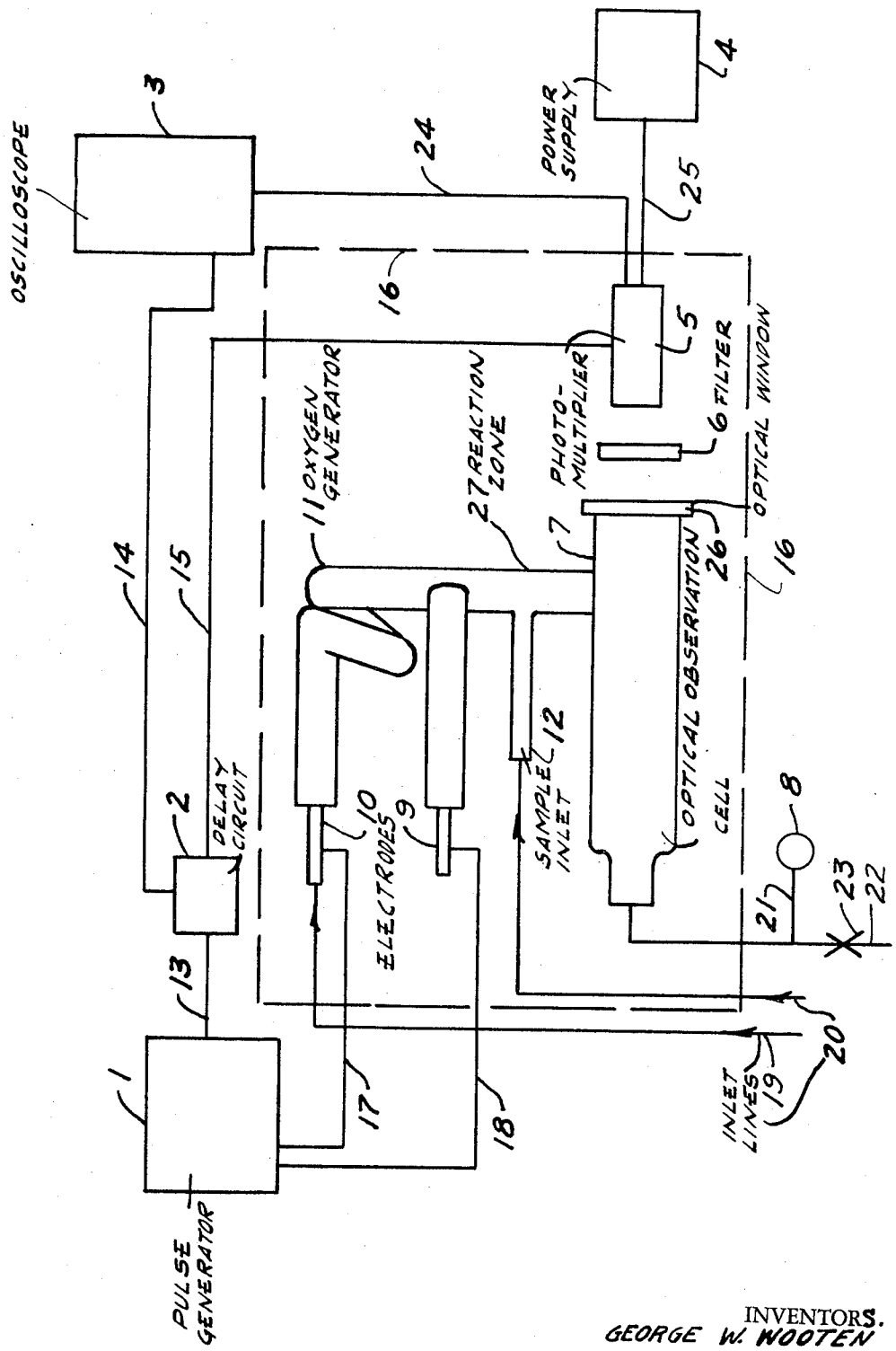

CHEMILUMINESCENT METHOD AND APPARATUS

BACKGROUND OF THE INVENTION

1. Field of the Invention

The invention relates to the field of chemistry and specifically to an analytical control method and apparatus therefore.

2. Description of the Prior Art

U.S. Pat. No. 3,528,779 teaches a chemiluminescent method of detecting ozone wherein nitric oxide is added at a constant flow rate to the gas mixture being tested quantitatively for ozone and the amount of chemiluminescent light is measured as an indication of the amount of ozone present in the gas.

U.S. Pat. No. 3,540,851 teaches the method for detecting trace quantities of any gas that, when subjected to an electrical discharge, produces oxygen atoms, e.g., sulfur oxides, carbon oxides, nitrogen oxides, molecular oxygen and other volatile oxides.

Monsanto Research Corporation under research and development Contract No. CPA-22-69-8 with the National Air Pollution Control Administration, developed a chemiluminescence instrument for detecting NO, CO and $SO_2$. In this instrument atomic oxygen was generated continuously by microwave discharge in the presence of molecular oxygen. Extraneous light including light generated by the atomic oxygen generator was optically excluded from the reaction chamber.

SUMMARY OF THE INVENTION

The invention is a chemiluminescent method and apparatus for detecting $NO_x$ (NO and $NO_2$), $SO_2$, CO and other gases which react with atomic oxygen to produce chemiluminescence. Atomic oxygen generated by pulse electrical discharge is added at a controlled and known flow rate to a reaction zone to which is also added at a controlled and known flow rate a gas mixture to be analyzed. The reaction zone is maintained at a sufficient pressure to support chemiluminescence, normally above about 0.1 Torr and in the range of about 0.5 to 5.0 Torr. Photoelectric means is used to measure the chemiluminescence, and the photoelectric means is synchronized with the pulse discharge so that the photoelectric means is turned off during the time of a pulse and for sufficient time thereafter to allow the light generated by the pulse discharge to disappear, whereby the only light the photoelectric means sees is chemiluminescence. The reaction zone and the oxygen generating means are compact and are located adjacent one another to allow miniaturization of the equipment.

BRIEF DESCRIPTION OF THE DRAWING

The FIGURE is a schematic drawing of the apparatus of the invention.

DESCRIPTION OF THE PREFERRED EMBODIMENTS

An apparatus has been developed that makes possible the construction of an on-line instrument capable of detecting gases that cause chemiluminescence effect when reacted with certain atoms. The apparatus is unique in the sense that it is miniaturized and comprises an atomic generator and reaction zone as an integrated unit, the apparatus is made of glass and includes the following features:

a. Atomic oxygen is produced by an electrical discharge. To eliminate excessive heating the discharge is actuated by a high voltage pulse of very low and adjustable duty cycle. The low duty cycle reduces the total power requirements and most important reduces heat dissipation within the system to a minimum. As a result, the following advantages are obtained:

1. The discharge tube can be made small and suitable for packaging.
2. Since pressure in the discharge tube must be substantially constant in order to maintain a constant operating point (stable operation) and since $\Delta P = f(\Delta T)$, the operation of the discharge tube remains stable due to the fact that no appreciable heat it being dissipated within the system.
3. There is a high efficiency of nascent oxygen generation.

An apparatus (described below) has been developed that integrates the atomic oxygen generator and reaction zone. Electrical discharge is used to generate atomic oxygen. The electronic system which has been developed will make the whole instrument practical and suitable for long term stability instrumentation.

In order to make packaging practical, the generator and reactor system are made out of small glass tubing with a small physical separation between the generator and the reactor. This feature produces the following effects:

a. Power required for the discharge tube is high enough to produce excessive heating of the glass tube when continuous power is applied.

b. Electrical discharge which is luminescence by itself may enter into the reaction chamber. The detected signal (by a photomultiplier) is much higher than the desired signal with the added luminescence of the electrical discharge source. Thus elaborate means of detection are required to extract the wanted signal due to chemiluminescence effect.

To eliminate heating effect, a pulsating high voltage supply is used. The rate of trigger of the pulse is variable from 1 pulse per second to 10 pulses per second. The duty cycle of the pulse is made to be 10 percent or less (the duty cycle is also adjustable) thus reducing the power consumption (heat dissipation) to one-tenth or less. Under these conditions the discharge tube remains for all practical purposes at ambient temperature.

To prevent the discharge signal from being detected by the photomultiplier tube (PMT), the PMT's gating on is delayed from the discharge pulse in time. This means that the PMT is gated on at a time later than the falling edge of the discharge pulse. During the interval that the discharge pulse is on, atomic oxygen is generated. The PMT is shut off and there is no viewing of luminescence from the discharge signal. At the time when the PMT is gated on, only the chemiluminescence effect is viewed since the gating on of the PMT has been delayed until all past effect from luminescence produced by the discharge pulse has disappeared.

The following is a description of the apparatus of the invention and process based on the drawing. A sample of a gas to be analyzed is introduced to inlet line 20 at a known and controlled rate and from there goes to sample inlet 12 and into the mixing and reaction zone 27. Molecular oxygen is introduced to inlet line 19 at a controlled and known rate, passes through hollow electrode 10 and flows into atomic oxygen generator 11. Atomic oxygen is generated by pulse discharge in the atomic oxygen generator. The other electrode for the oxygen generator is a solid electrode 9. Pulse generator 1 provides the pulses and is connected by wires 17 and 18 to electodes 10 and 9, respectively. Atomic oxygen generator 11 is particularly in the form of a spiral to add length and is made of hollow glass tubing which is sealed at each end to an electrode. The particular atomic oxygen generator used required about 1,200 volts and the pulse width used varied from about 50 to 100 milliseconds. Atomic oxygen generated in atomic oxygen generator 11 flows into the mixing and reaction zone 27 made of hollow glass tubing where it contacts the gas being analyzed, and chemiluminescence light or glow is generated in intensity proportional to the quantity of chemiluminescence reactant in the sample being analyzed, i.e. $NO_x$, $SO_2$, CO and the like. From mixing and reaction zone 27 the reactants flow into optical observation cell 7. Observation cell 7 is maintained at a pressure sufficient to support chemiluminescence normally in excess of about 0.1 Torr and in the range of about 0.5 to 5.0 Torr by a vacuum pump not shown which pulls the vacuum on the observation cell by outlet line 22 through valve 23 which communicates with observation cell 7. Vacuum gage 8 connected by line 21 to line 22 measures the pressure in the observation cell. Optical window 26 in the observation cell allows viewing of the chemiluminescence glow in the cell. The chemiluminescent glow is viewed through band-pass filters 6 that isolate a specific spectral band for each pollutant, e.g., when the instrument is designed to examine for $NO_x$, CO and $SO_2$, 3 band-pass/filters are used. Photomultiplier 5 measures the intensity of the chemiluminescence glow. During the time when the pulse is being applied to the electrodes by pulse generator 1 photomultiplier 5 is shut off as a result of synchronization by delay circuit 2 which is connected to the photomultiplier by synchronization wire 15 and synchronization wire 13 connects delay circuit 2 to pulse generator 1. In fact the photomultiplier 5 is shut off for a time subsequent to the end of a pulse sufficient to allow glow generated by a pulse in atomic oxygen generator 11 to fade out. Then photomultiplier 5 is gated on between pulses to view the chemiluminescence glow in observation cell 7 through optical filters 6 and optical window 26. Photomultiplier power supply 4 provides the power for photomultiplier 5 and is connected thereto by wire 25. The output from photomultiplier 5 can be viewed on oscilloscope 3 which will show the amount of chemiluminescent glow which is proportional to the amount of $NO_x$, CO or $SO_2$ or the like being measured in the sample, the instrument having been calibrated with known samples containing known amount of $NO_x$, CO, and $SO_2$. The oscilloscope is connected by wire 24 to photomultiplier 5, and the oscilloscope is connected by synchronizing wire 14 to delay circuit 2 for synchronization with the pulse generator 1. Case 16 surrounds the portions of the equipment shown in the FIGURE.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. In a method for detecting in a mixture of gases the presence and concentration of gases which react with atomic oxygen to produce chemiluminescence including the steps of reacting said mixture of gases with atomic oxygen and measuring the chemiluminescent light generated by the reaction of the said mixture of gases with atomic oxygen, wherein the improvement comprises generating atomic oxygen by pulsed electrical discharge, and gating the means for measuring the chemiluminescent light so that said means for measuring is turned off during the time that the means for generating atomic oxygen by pulsed electrical discharge is on and until the light from the oxygen generating pulse has disappeared so only the chemiluminescent light is viewed.

2. A method of claim 1 wherein said electrical discharge is pulsed at a rate of from 1 pulse per second to 10 pulses per second, and the duty cycle of said pulses is 10 percent or less.

3. In an apparatus for measuring chemiluminescence in gases including means to produce atomic oxygen, a reaction zone including means to maintain pressure in said zone sufficient to support chemiluminescence, means to introduce atomic oxygen into said zone, means to introduce into said zone a gas mixture for analysis and means to detect the quantity of chemiluminescent light generated, the improvement comprising pulse discharge means for producing atomic oxygen and photoelectric means to detect the quantity of chemiluminescent light generated by the gas mixture and atomic oxygen mixed in said zone, said photoelectric means being synchronized with said pulse discharge means so said photoelectric means is turned off until the light generated by said pulse discharge means has disappeared and thus only chemiluminescent light is measured.

4. A miniaturized apparatus of claim 3 wherein said pulse discharge means produces from 1 to 10 pulses per second, the duty cycle of said pulses is 10 percent or less, and said means to produce atomic oxygen and said reaction zone are located adjacent each other and are made as small as possible.

* * * * *